3,385,728
Patented May 28, 1968

3,385,728
METHOD OF COATING A BASE WITH A CARBOXYLATED LATEX CONTAINING HYDROXYLAMINE HYDROCHLORIDE
Maurice J. Walsh III, Gastonia, N.C., assignor to Uniroyal Inc., a corporation of New York
No Drawing. Filed June 22, 1964, Ser. No. 377,058
2 Claims. (Cl. 117—161)

ABSTRACT OF THE DISCLOSURE

Carboxylated rubber latex, such as latex of a terpolymer of butadiene, styrene and itaconic acid or methacrylic acid, or similar ethylenically unsaturated carboxylic acid, after neutralization with ammonia, is treated with hydroxylamine hydrochloride (0.2 to 5 parts per 100 parts by weight of terpolymer). A solid deposit from the latex, after heating at 150°–400° F., is resistant to hot water. Fabric coated or sized with the latex can be subjected to dyeing, washing, and similar wet processing at elevated temperature without removal or disintegration of the rubber coating.

---

This invention relates to an improved carboxylated latex, containing hydroxylamine hydrochloride, characterized by the fact that a solid deposit from such latex is resistant to water. The invention also relates to a fabric coated or sized with a deposit of carboxylated latex containing hydroxylamine hydrochloride.

Certain fabrics, such as upholstery fabrics, fabric rugs, or the like, are commonly backed with a deposit of rubber latex. The latex coating serves various purposes, such as stiffening the fabric, locking pile tufts in position, or providing an antislip surface. Unfortunately, conventional latex deposits are frequently not as water resistant as would be desirable with the result that the deposit is injured by washing, or is damaged during such wet processing operations as dyeing the fabric. Improvement in this respect is possible by vulcanizing the latex in accordance with conventional practice but this too has certain disadvantages, notably a tendency to yellow or discolor with age, due to the presence of the conventional vulcanizing compounding ingredients.

It has now been discovered, in accordance with the invention, that if hydroxylamine hydrochloride is added to a carboxylated rubber latex, the solids deposited from such latex, after drying, are remarkably resistant to water. The carboxylated rubber latex employed in the invention is a conventional material typically made by aqueous emulsion copolymerization of a conjugated diene such as butadiene, with styrene or an equivalent copolymerizable monomer, and a copolymerizable ethylenically unsaturated carboxylic acid such as itaconic acid, fumaric acid, methacrylic acid, acrylic acid, or the like. Usually the weight ratio of butadiene:styrene in the copolymer varies from about 20:80 to 90:10, while the content of carboxylic acid in the copolymer varies from about 0.2 to 10%, based on the entire weight of the copolymer (all quantities are expressed herein by weight unless otherwise indicated).

In practicing the invention, there is added to the carboxylated rubber latex from about 0.2 to about 5 or more parts of hydroxylamine hydrochloride, per 100 parts of copolymer solids in the latex. The latex composition may further contain such accessory compounding ingredients as pigments or fillers, stabilizers, antioxidants, surface active agents, preservatives, viscosity control agents, etc., in accordance with conventional practice.

The carboxylated latex to which the hydroxylamine hydrochloride is added in accordance with the invention is first neutralized, preferably with ammonia, to provide a pH on the alkaline side, preferably about 9 to about 9.5. The total solids content of the latex composition is not critical, but in ordinary practice will range from about 20% or less to about 60% or more. The latex composition may be applied to the fabric in any suitable conventional manner, such as by dipping, spreading, roll coating, or spraying, after which the latex deposit is dried on the fabric. Ordinarily elevated temperature is employed in the drying, for example a temperature of 150°–400° F., preferably 200°–375° F. If the latex is dried at room temperature, the coating is subsequently subjected to the heating conditions indicated. While it is not desired to limit the invention to any particular theory of operation, it appears that during the heating the hydroxylamine hydrochloride apparently converts the carboxylated rubber into water-resistant form. In any event, it is most surprising that this property is developed in the latex deposit without the use of conventional curatives, thermosetting resins, or the like. So resistant is the resulting dried carboxylated rubber deposit to water that the thus-treated fabric can be subjected to dyeing, washing, and similar wet processing without removal of or disintegration of the rubber coating. In a typical dyeing process the coated fabric may be heated in near boiling water for about one hour; the great importance of a water-resistant rubber deposit under such conditions will be appreciated.

If desired, the latex composition of the invention may include conventional additives for the purpose of improving the dyeability. Thus, improved dyeability may be achieved by including in the composition such additives as polyvinyl acetate or polyvinyl pyrrolidone, as disclosed in U.S. Patent 3,138,431, J. W. Swiggett, June 23, 1964. This is particularly desirable in applications where some of the latex backing seeps through to the front of the fabric being treated in such a way as to be visible from the face of the fabric. In such cases, it is important that the rubber become dyed when the fabric is dyed, to produce a uniform appearance. Backsizing of upholstery fabric is a typical application in which dyeability of the rubber is frequently desirable.

In some cases it may be desirable to blend the latex composition of the invention with a conventional latex of a non-carboxylated polymer.

The deposit obtained from the hydroxylamine hydrochloride-containing carboxylated latex in accordance with the invention is characterized by excellent adhesion to the fabric but is devoid of objectionable tackiness. The deposit offers excellent dimensional stability, and good ageing. In some instances, better seam-locking is obtained. Discoloration associated with conventional curatives, and undesirable odors, are avoided by use of the invention.

The latex composition of the invention may be used for paper saturating and other impregnating, coating, or binding applications where water resistance is desired. The coating of the invention may be applied to bases other than fabric if desired. The latex of the invention is stable in storage and shipment and in processing.

The following examples will serve to illustrate the practice of the invention in more detail.

Example I

In this example there is employed a conventional carboxylated rubber latex containing about 51% solids, based on a terpolymer of 40% butadiene, 59% styrene and 1% itaconic acid. The latex is neutralized with 28% aqueous ammonia to adjust the pH to 9–9.5. There is dissolved in the latex 1 part of hydroxylamine hydrochloride (per 100 parts of carboxylated polymer). Sufficient water is included in the composition to adjust the solids content to about 43%. The latex is spread on a fabric using a roll coater; the coating is dried for 5 minutes in an oven heated to about 350° F. The resulting coating is resistant to boiling water. Similar coatings made without the hydroxylamine hydrochloride, or made from non-carboxylated latex (with or without hydroxylamine hydrochloride) are not resistant to boiling water.

The latex composition of this example may further include optional latex compounding ingredients, such as:

| Ingredients: | Parts per 100 of carboxylated polymer |
|---|---|
| Anionic surface active agent dispersant (e.g., sodium salt of formaldehyde condensed naphthalene sulfonic acid or "Tamol 731" [sodium salt of polymeric carboxylic acid]) | 0.25 |
| Pigment or filler (e.g., calcium carbonate) | 70.00 |
| Preservative (e.g., sodium ortho phenyl phenate) | 0.25 |
| Antioxidant (beta, beta'-bis [2-hydroxy-3 nonyl-5-methylbenzylthio] diethyl ether) | 2.39 |
| Kayara gum | 0.50 |
| Potassium oleate | 0.10 |
| Antifoam agent (e.g., dimethyl poly siloxane) | 0.10 |
| Viscosity control agent (e.g., sodium polyacrylate, 10% solution in water) | 2.00 |

Example II

Example I may be repeated, using a latex of a copolymer of styrene-butadiene-methacrylic acid in weight ratio of 58/40/2, total solids about 50%. The pH is adjusted to 9–9.5 with ammonia. 1 part of hydroxylamine hydrochloride is added (per 100 parts of copolymer in the latex). Cotton fabric may be coated with the composition, then dried 5 minutes at 300° F. Other fabrics may be used, such as those based on acetate, nylon, or combinations of textile materials.

Having thus described my invention, what I claim and desire to protect by Letters Patent is:

1. Method comprising providing a latex of a terpolymer of butadiene, styrene and a copolymerizable ethylenically unsaturated carboxylic acid, the weight ratio of butadiene:styrene being from 20:80 to 90:10 and the carboxylic acid content of the terpolymer being from 0.2 to 10% based on the total weight of terpolymer, neutralizing the said latex with ammonia, adding hydroxylamine hydrochloride in amount of at least 0.2 part per 100 parts by weight of said terpolymer, depositing the resulting latex composition on a base to form a coating, and thereafter heating the coating to a temperature of from 150 to 400° F., whereby the coating becomes highly resistant to water.

2. A method as in claim 1 in which the coating is heated to a temperature of 200–375° F.

References Cited

UNITED STATES PATENTS

| 2,462,591 | 2/1949 | Arundale | 260—84.5 |
| 2,657,151 | 10/1953 | Gensel et al. | 117—47 |
| 2,692,250 | 10/1954 | Walter | 260—45.9 |
| 2,791,520 | 5/1957 | Gerke et al. | 117—161 |
| 2,793,142 | 5/1957 | Brace | 117—135.5 |
| 2,808,341 | 10/1957 | Canter | 117—65 |
| 2,868,754 | 1/1959 | Eilbeck et al. | 260—29.7 |
| 3,165,423 | 1/1965 | Caldwell et al. | 117—135.5 |
| 3,190,765 | 6/1965 | Yuan | 117—63 |
| 3,264,241 | 8/1966 | Abrahams et al. | 260—29.4 |
| 3,293,073 | 12/1966 | Goodman et al. | 117—139.4 |
| 3,332,797 | 7/1967 | Strasser et al. | 117—138.5 |

WILLIAM D. MARTIN, *Primary Examiner.*

W. D. HERRICK, *Assistant Examiner.*